United States Patent
Zhang et al.

(10) Patent No.: US 10,863,548 B2
(45) Date of Patent: Dec. 8, 2020

(54) GROUP CSI FEEDBACK FOR MULTICAST/BROADCAST TRANSMISSION

(71) Applicant: QUALCOMM Incorporated, San Diego, CA (US)

(72) Inventors: Xiaoxia Zhang, San Diego, CA (US); Xipeng Zhu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 22 days.

(21) Appl. No.: 16/372,532

(22) Filed: Apr. 2, 2019

(65) Prior Publication Data

US 2019/0313459 A1 Oct. 10, 2019

Related U.S. Application Data

(60) Provisional application No. 62/654,037, filed on Apr. 6, 2018.

(51) Int. Cl.
H04W 74/08 (2009.01)
H04B 7/06 (2006.01)
(Continued)

(52) U.S. Cl.
CPC ...... H04W 74/0833 (2013.01); H04B 7/0417 (2013.01); H04B 7/0626 (2013.01);
(Continued)

(58) Field of Classification Search
CPC . H04W 74/0833; H04W 88/02; H04W 88/08; H04W 24/10; H04W 76/40;
(Continued)

(56) References Cited

U.S. PATENT DOCUMENTS

2017/0230986 A1* 8/2017 Moon ............... H04W 74/08

FOREIGN PATENT DOCUMENTS

CN 106211093 A 12/2016
WO 2009005219 A1 1/2009

OTHER PUBLICATIONS

Alcatel: "CQI Reporting in E-MBMS Single Cell Transmission", 3GPP Draft; R2-063372, 3rd Generation Partnership Project (3GPP). Mobile Competence Centre ; 650, Route Des Lucioles ; F-06921 Sophia-Antipolis Cedex; France, vol. RAN WG2, No. Riga, Latvia; Nov. 1, 2006, Nov. 1, 2006 (Nov. 1, 2006), XP050132850, 5 Pages, [retrieved on Nov. 1, 2006], sec.2; p. 1-p. 3.
(Continued)

*Primary Examiner* — Afshawn M Towfighi
(74) *Attorney, Agent, or Firm* — Kevin M. Donnelly

(57) ABSTRACT

Various aspects of the present disclosure generally relate to wireless communication. In some aspects, a user equipment may receive configuration information identifying at least one random access channel resource to be used for channel state information (CSI) feedback regarding a multicast or broadcast (multicast/broadcast) signal; and transmit a signal based at least in part on the CSI feedback using the at least one random access channel resource. In some aspects, a base station may transmit configuration information identifying at least one random access channel resource to be used for CSI feedback regarding a multicast or broadcast (multicast/broadcast) signal to be provided to a plurality of user equipment (UEs); and determine the CSI feedback based at least in part on a signal received on the at least one random access channel resource. Numerous other aspects are provided.

32 Claims, 9 Drawing Sheets

(51) Int. Cl.
　　　*H04L 5/00*　　　　(2006.01)
　　　*H04W 88/02*　　　(2009.01)
　　　*H04W 88/08*　　　(2009.01)
　　　*H04B 7/0417*　　　(2017.01)

(52) U.S. Cl.
　　　CPC ............ *H04L 5/005* (2013.01); *H04W 88/02*
　　　　　　(2013.01); *H04W 88/08* (2013.01); *H04L*
　　　　　　　　　　　　　　　　*5/0007* (2013.01)

(58) Field of Classification Search
　　　CPC .. H04B 7/0626; H04B 7/0417; H04B 7/0632;
　　　　　　H04L 5/005; H04L 5/0007; H04L 5/0094;
　　　　　　H04L 5/0023; H04L 5/001; H04L 5/0048;
　　　　　　　　　　　　　H04L 5/14; H04L 5/0057
　　　See application file for complete search history.

(56) References Cited

OTHER PUBLICATIONS

International Search Report and Written Opinion—PCT/US2019/025561—ISA/EPO—dated Jun. 24, 2019.
Vodafone Group: "Report of Email Discussion on UE State during MBMS Reception (point 1)", 3GPP Draft; R2-072074, 3rd Generation Partnership Project (3GPP), Mobile Competence Centre, 650, Route Des Lucioles, F-06921 Sophia-Antipolis Cedex, France, vol. RAN WG2, No. Kobe, Japan; May 15, 2007, May 15, 2007 (May 15, 2007), XP050134944, 10 Pages, [retrieved on May 15, 2007], sec.5.6; p. 6-p. 9, sec.1; p. 1, p. 4.

* cited by examiner

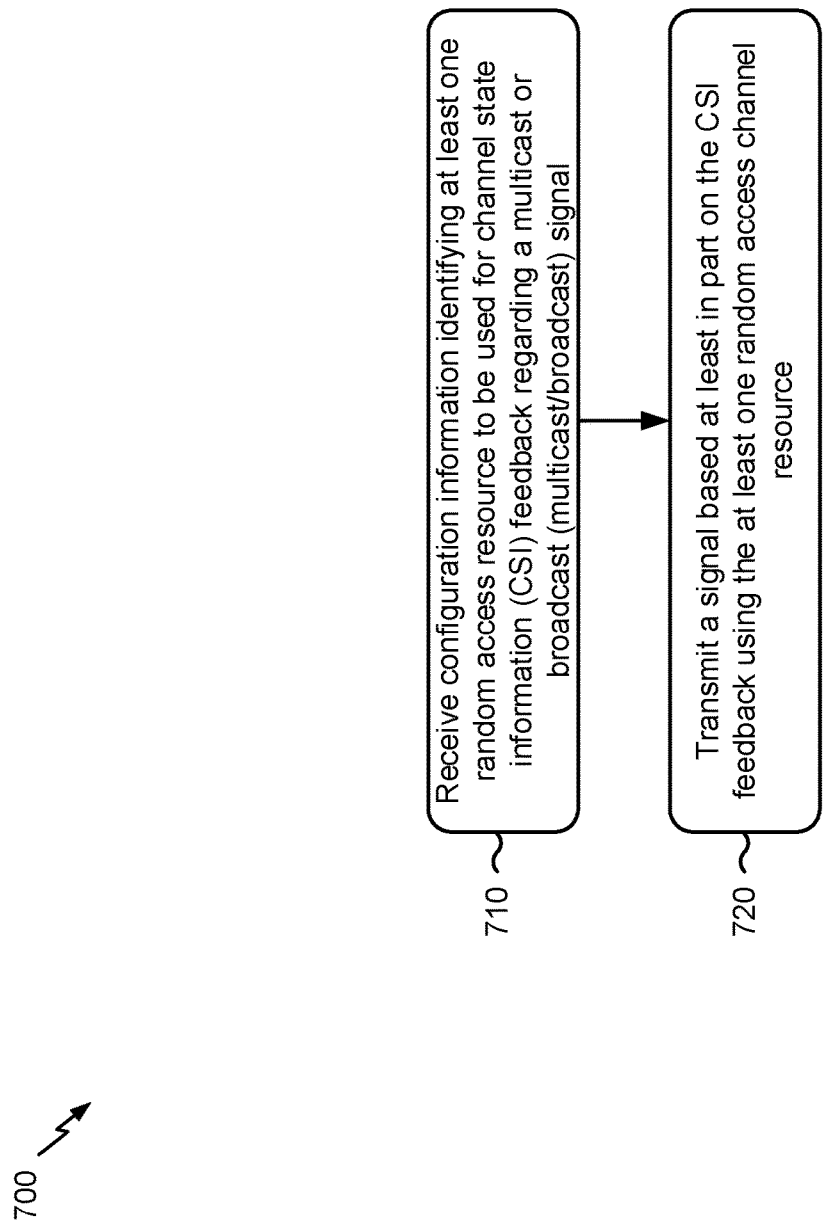

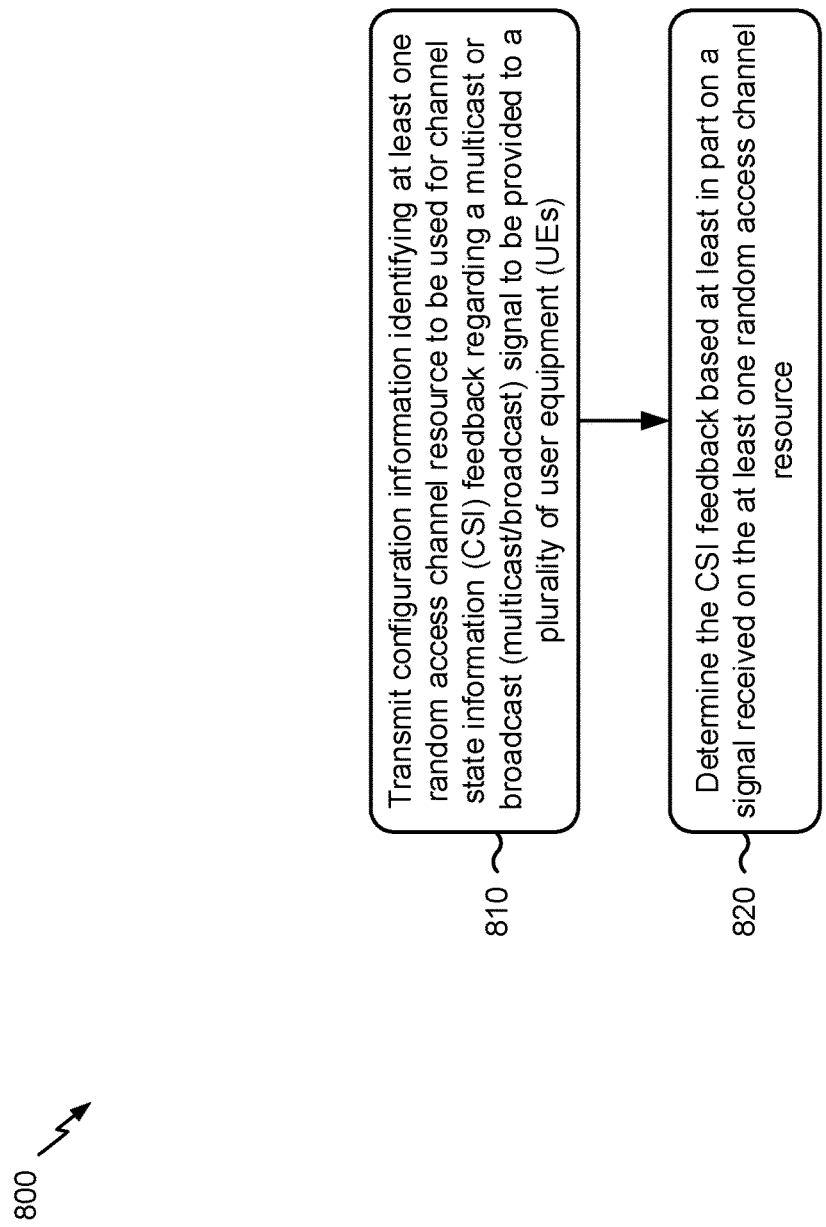

GROUP CSI FEEDBACK FOR MULTICAST/BROADCAST TRANSMISSION

CROSS-REFERENCE TO RELATED APPLICATIONS UNDER 35 U.S.C. § 119

This application claims priority to Provisional Patent Application No. 62/654,037, filed on Apr. 6, 2018, entitled "TECHNIQUES AND APPARATUSES FOR GROUP CSI FEEDBACK FOR MULTICAST/BROADCAST TRANSMISSION" which is hereby expressly incorporated by reference herein.

FIELD OF THE DISCLOSURE

Aspects of the present disclosure generally relate to wireless communication, and more particularly to techniques and apparatuses for group channel state information (CSI) feedback for multicast or broadcast (multicast/broadcast) transmission.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include receiving configuration information identifying at least one random access channel resource to be used for channel state information (CSI) feedback regarding a multicast or broadcast (multicast/broadcast) signal; and transmitting a signal based at least in part on the CSI feedback using the at least one random access channel resource.

In some aspects, a UE for wireless communication may include memory and one or more processors operatively coupled to the memory. The memory and the one or more processors may be configured to receive configuration information identifying at least one random access channel resource to be used for CSI) feedback regarding a multicast/broadcast signal; and transmit a signal based at least in part on the CSI feedback using the at least one random access channel resource.

In some aspects, a non-transitory computer-readable medium may store one or more instructions for wireless communication. The one or more instructions, when executed by one or more processors of a UE, may cause the one or more processors to receive configuration information identifying at least one random access channel resource to be used for CSI feedback regarding a multicast/broadcast signal; and transmit a signal based at least in part on the CSI feedback using the at least one random access channel resource.

In some aspects, an apparatus for wireless communication may include means for receiving configuration information identifying at least one random access channel resource to be used for CSI feedback regarding a multicast/broadcast signal; and means for transmitting a signal based at least in part on the CSI feedback using the at least one random access channel resource.

In some aspects, a method of wireless communication, performed by a base station, may include transmitting configuration information identifying at least one random access channel resource to be used for CSI feedback regarding a multicast/broadcast signal to be provided to a plurality of UEs; and determining the CSI feedback based at least in part on a signal received on the at least one random access channel resource.

In some aspects, a base station for wireless communication may include memory and one or more processors operatively coupled to the memory. The memory and the one or more processors may be configured to transmit configuration information identifying at least one random access channel resource to be used for CSI feedback regarding a multicast/broadcast signal to be provided to a plurality of UEs; and determine the CSI feedback based at least in part on a signal received on the at least one random access channel resource.

In some aspects, a non-transitory computer-readable medium may store one or more instructions for wireless communication. The one or more instructions, when executed by one or more processors of a base station, may cause the one or more processors to transmit configuration information identifying at least one random access channel resource to be used for CSI feedback regarding a multicast/broadcast signal to be provided to a plurality of UEs; and determine the CSI feedback based at least in part on a signal received on the at least one random access channel resource.

In some aspects, an apparatus for wireless communication may include means for transmitting configuration information identifying at least one random access channel resource to be used for CSI feedback regarding a multicast/broadcast signal to be provided to a plurality of UEs; and means for determining the CSI feedback based at least in part on a signal received on the at least one random access channel resource.

Aspects generally include a method, apparatus, system, computer program product, non-transitory computer-readable medium, user equipment, base station, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It should be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 7 is a diagram illustrating an example process performed, for example, by a user equipment, in accordance with various aspects of the present disclosure.

FIG. 8 is a diagram illustrating an example process performed, for example, by a base station, in accordance with various aspects of the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
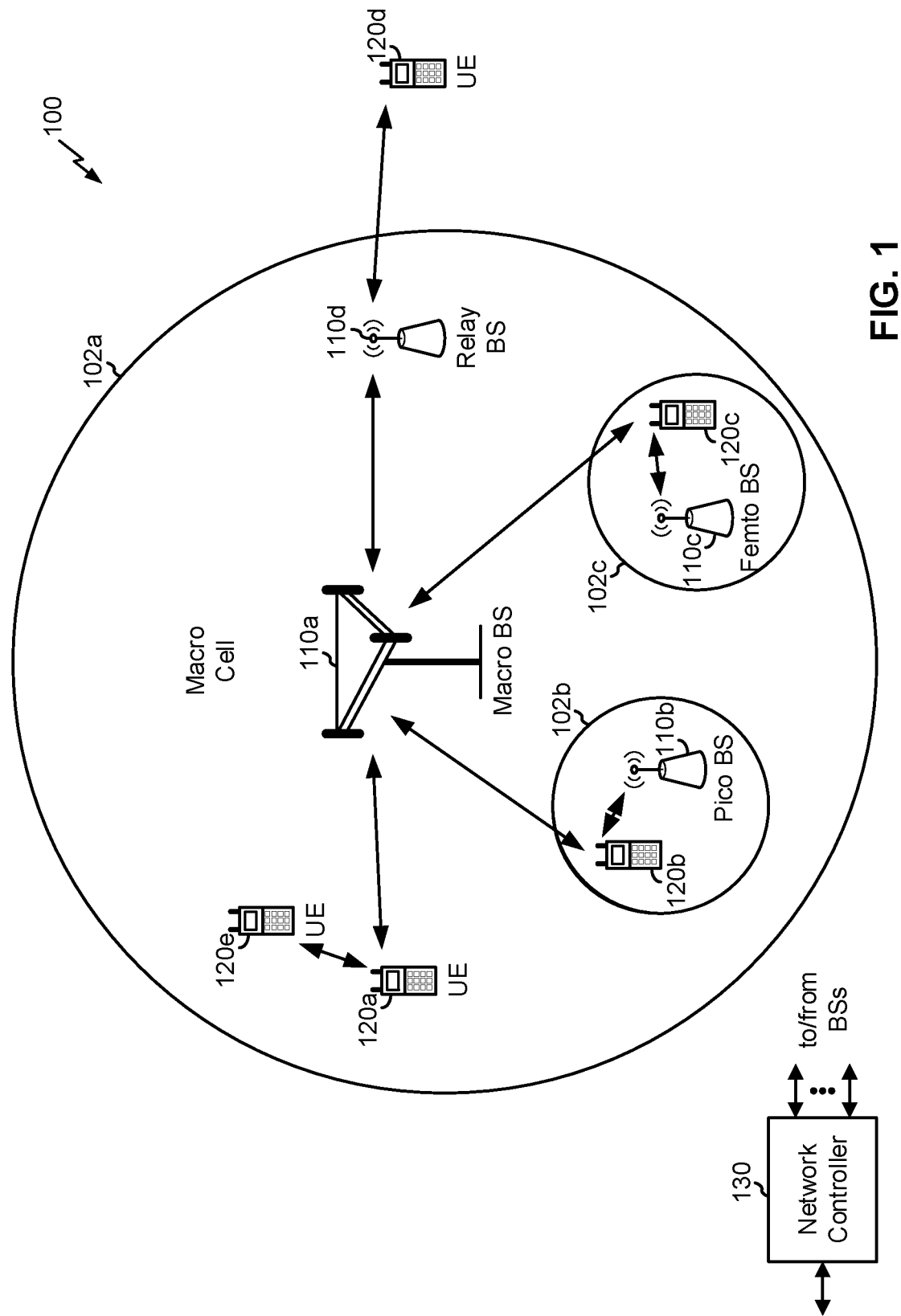
FIG. 1 is a block diagram conceptually illustrating an example of a wireless communication network, in accordance with various aspects of the present disclosure.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110*a*, BS 110*b*, BS 110*c*, and BS 110*d*) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, a biometric sensor/device, a wearable device (e.g., a smart watch, smart clothing, smart glasses, smart wrist bands, smart jewelry (e.g., smart ring, smart bracelet)), an entertainment device (e.g., a music or video device, or a satellite radio), a vehicular component or sensor, a smart meter/sensor, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a BS 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the BS 110.

As indicated above, FIG. 1 is provided merely as an example. Other examples may differ from what is described with regard to FIG. 1.

Figure 2:
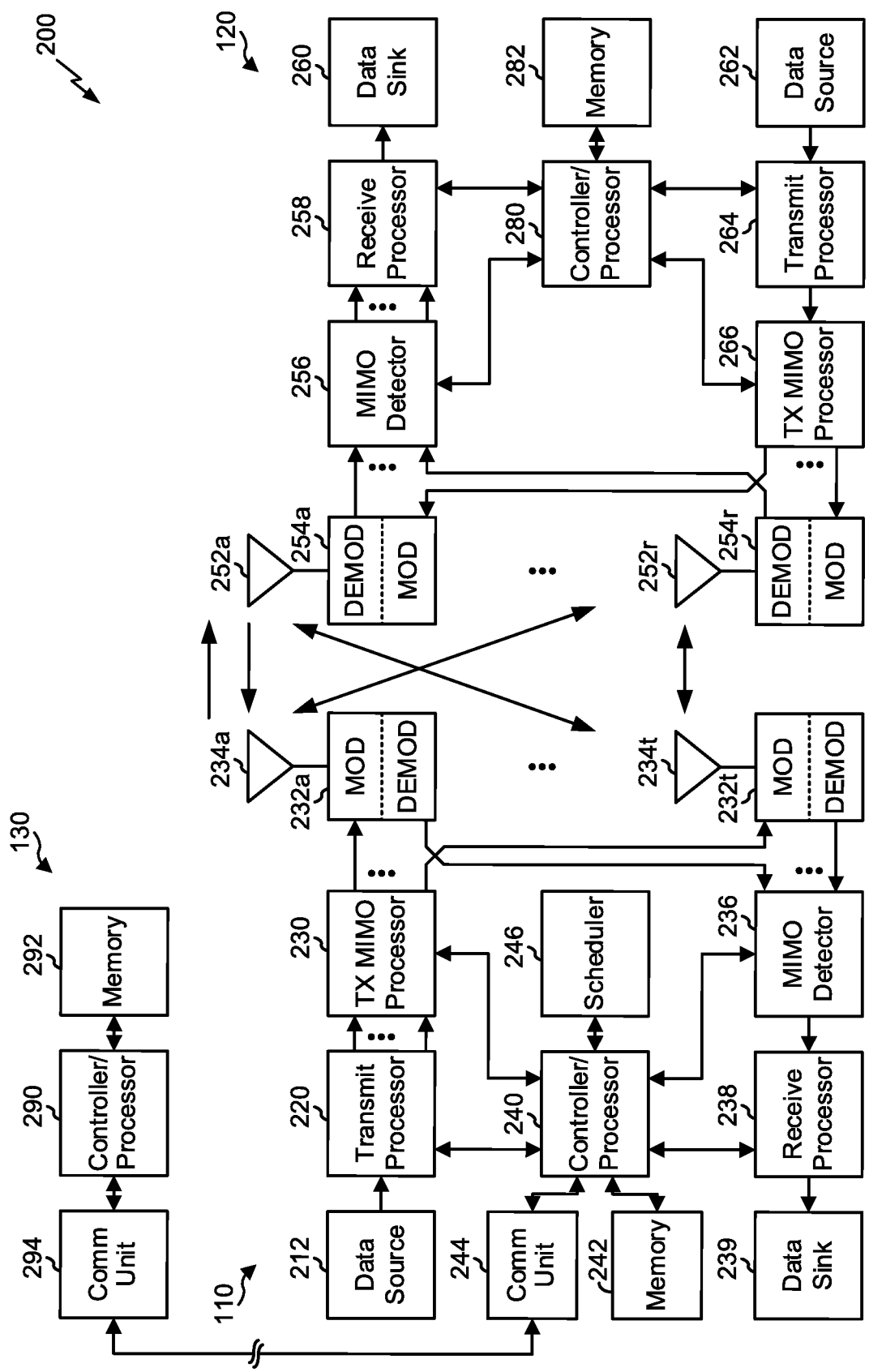
FIG. 2 is a block diagram conceptually illustrating an example of a base station in communication with a UE in a wireless communication network, in accordance with various aspects of the present disclosure.

FIG. 2 shows a block diagram of a design 200 of BS 110 and UE 120, which may be one of the base stations and one of the UEs in FIG. 1. BS 110 may be equipped with T antennas 234a through 234t, and UE 120 may be equipped with R antennas 252a through 252r, where in general T≥1 and R≥1.

At BS 110, a transmit processor 220 may receive data from a data source 212 for one or more UEs, select one or more modulation and coding schemes (MCS) for each UE based at least in part on channel quality indicators (CQIs)

received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from BS 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to BS 110. At BS 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. BS 110 may include communication unit 244 and communicate to network controller 130 via communication unit 244. Network controller 130 may include communication unit 294, controller/processor 290, and memory 292.

In some aspects, one or more components of UE 120 may be included in a housing. Controller/processor 240 of BS 110, controller/processor 280 of UE 120, and/or any other component(s) of FIG. 2 may perform one or more techniques associated with group CSI for multicast/broadcast transmissions, as described in more detail elsewhere herein. For example, controller/processor 240 of BS 110, controller/processor 280 of UE 120, and/or any other component(s) of FIG. 2 may perform or direct operations of, for example, process 700 of FIG. 7, process 800 of FIG. 8, and/or other processes as described herein. Memories 242 and 282 may store data and program codes for BS 110 and UE 120, respectively. A scheduler 246 may schedule UEs for data transmission on the downlink and/or uplink.

In some aspects, UE 120 may include means for receiving configuration information identifying at least one random access channel resource to be used for CSI feedback regarding a multicast/broadcast signal, means for transmitting a signal based at least in part on the CSI feedback using the at least one random access channel resource, means for selecting the at least one random access channel resource from the plurality of random access channel resources based at least in part on the CSI feedback, means for determining the CSI feedback based at least in part on a reference signal associated with the multicast/broadcast signal, and/or the like. In some aspects, such means may include one or more components of UE 120 described in connection with FIG. 2.

In some aspects, BS 110 may include means for transmitting configuration information identifying at least one random access channel resource to be used for CSI feedback regarding a multicast/broadcast signal to be provided to a plurality of UEs, means for determining the CSI feedback based at least in part on a signal received on the at least one random access channel resource, means for determining a modulation or coding configuration based at least in part on the CSI feedback, and/or the like. In some aspects, such means may include one or more components of BS 110 described in connection with FIG. 2.

As indicated above, FIG. 2 is provided merely as an example. Other examples may differ from what is described with regard to FIG. 2.

Figure 3A:
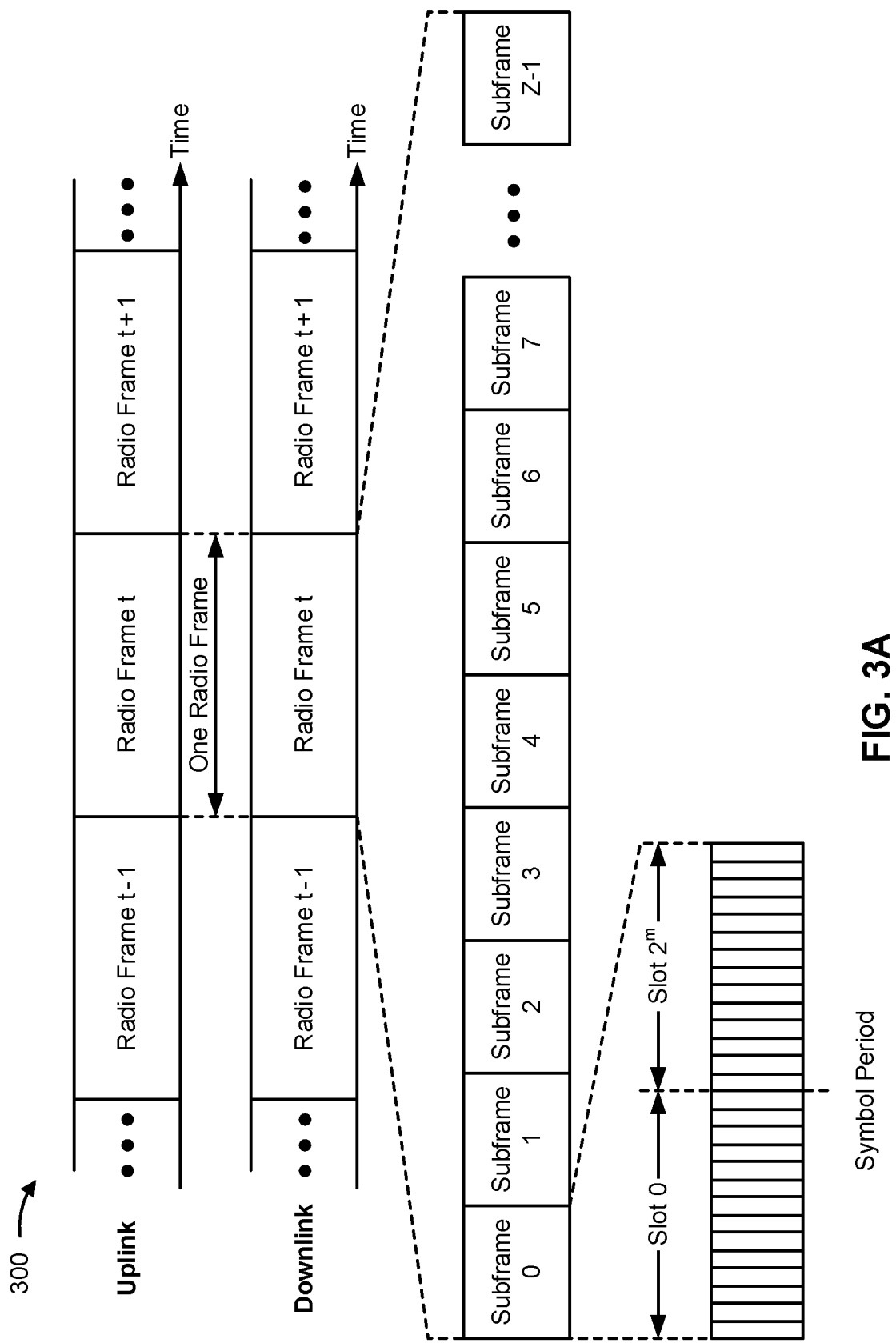
FIG. 3A is a block diagram conceptually illustrating an example of a frame structure in a wireless communication network, in accordance with various aspects of the present disclosure.

FIG. 3A shows an example frame structure 300 for frequency division duplexing (FDD) in a telecommunications system (e.g., NR). The transmission timeline for each of the downlink and uplink may be partitioned into units of radio frames (sometimes referred to as frames). Each radio frame may have a predetermined duration (e.g., 10 milliseconds (ms)) and may be partitioned into a set of Z (Z≥1) subframes (e.g., with indices of 0 through Z−1). Each subframe may have a predetermined duration (e.g., 1 ms) and may include a set of slots (e.g., $2^m$ slots per subframe are shown in FIG. 3A, where m is a numerology used for a transmission, such as 0, 1, 2, 3, 4, and/or the like). Each slot may include a set of L symbol periods. For example, each slot may include fourteen symbol periods (e.g., as shown in FIG. 3A), seven symbol periods, or another number of symbol periods. In a case where the subframe includes two slots (e.g., when m=1), the subframe may include 2L symbol periods, where the 2L symbol periods in each subframe may be assigned indices of 0 through 2L−1. In some aspects, a scheduling unit for the FDD may be frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol. Additionally, or alternatively, different configurations of wireless communication structures than those shown in FIG. 3A may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
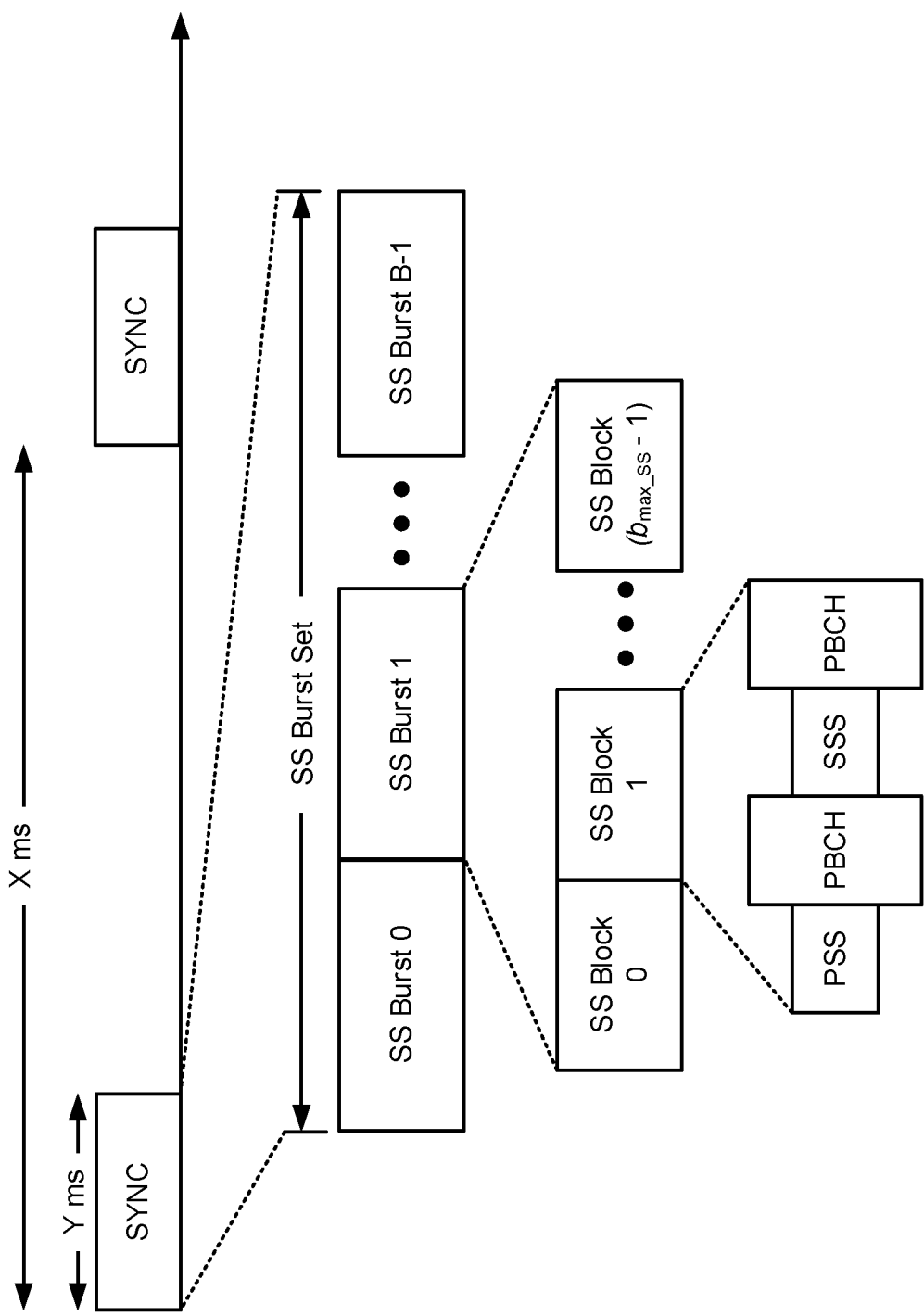
FIG. 3B is a block diagram conceptually illustrating an example synchronization communication hierarchy in a wireless communication network, in accordance with various aspects of the present disclosure.

FIG. 3B is a block diagram conceptually illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B−1, where B is a maximum number of repetitions of the SS burst that may be transmitted by the base station). As further shown, each SS burst may include one or more SS blocks (identified as SS block 0 through SS block ($b_{max\_SS}-1$), where $b_{max\_SS}-1$ is a maximum number of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more subframes. Additionally, or alternatively, one or more SS blocks of the SS burst may be transmitted in non-consecutive radio resources.

In some aspects, the SS bursts may have a burst period, whereby the SS blocks of the SS burst are transmitted by the base station according to the burst period. In other words, the SS blocks may be repeated during each SS burst. In some aspects, the SS burst set may have a burst set periodicity, whereby the SS bursts of the SS burst set are transmitted by the base station according to the fixed burst set periodicity. In other words, the SS bursts may be repeated during each SS burst set.

The base station may transmit system information, such as system information blocks (SIBs) on a physical downlink shared channel (PDSCH) in certain subframes. The base station may transmit control information/data on a physical downlink control channel (PDCCH) in C symbol periods of a subframe, where B may be configurable for each subframe. The base station may transmit traffic data and/or other data on the PDSCH in the remaining symbol periods of each subframe.

As indicated above, FIGS. 3A and 3B are provided as one or more examples. Other examples may differ from what is described with regard to FIGS. 3A and 3B.

Figure 4:
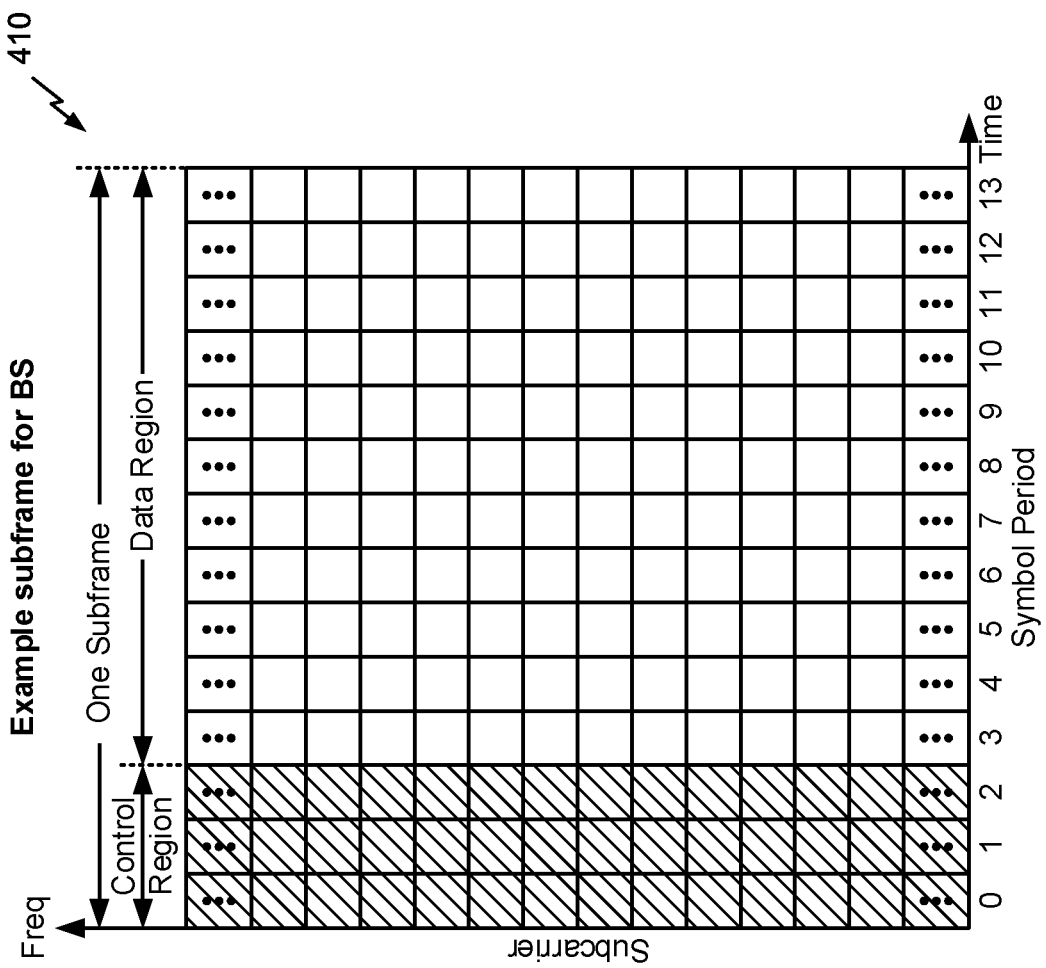
FIG. 4 is a block diagram conceptually illustrating an example subframe format with a normal cyclic prefix, in accordance with various aspects of the present disclosure.

FIG. 4 shows an example subframe format 410 with a normal cyclic prefix. The available time frequency resources may be partitioned into resource blocks. Each resource block may cover a set of subcarriers (e.g., 12 subcarriers) in one slot and may include a number of resource elements. Each resource element may cover one subcarrier in one symbol period (e.g., in time) and may be used to send one modulation symbol, which may be a real or complex value. In some aspects, subframe format 410 may be used for transmission of SS blocks that carry the PSS, the SSS, the PBCH, and/or the like, as described herein.

An interlace structure may be used for each of the downlink and uplink for FDD in certain telecommunications systems (e.g., NR). For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, etc., where $q \in \{0, \ldots, Q-1\}$.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-interference-plus-noise ratio (SINR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. New Radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using time division duplexing (TDD). In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such as central units or distributed units.

As indicated above, FIG. 4 is provided as an example. Other examples may differ from what is described with regard to FIG. 4.

Channel state information (CSI) provides a transmitter with feedback regarding a transmitted signal, such as a channel or reference signal. Examples of CSI include a channel quality indicator (CQI), a precoding matrix indicator (PMI), a precoding type indicator (PTI), a rank indication (RI), and/or the like. The transmitter may select a transmission rate based at least in part on the CSI. For example, when CSI indicates that the channel is of low quality, the transmitter may select a more conservative or robust rate to ensure that data is successfully delivered. When CSI indicates that the channel is of high quality, the transmitter may select a less conservative or more sophisticated (e.g., faster) rate to improve throughput and take advantage of the high quality channel.

Multicast/broadcast refers to a wireless communication that is multicast or broadcast to multiple different receivers. Examples of multicast/broadcast communications include multimedia broadcast/multicast service (MBMS) via a multicast/broadcast single-frequency network (MBSFN) area, single-cell point-to-multipoint (SC-PTM) over a physical cell or a virtual cell, and system broadcast information.

In some multicast/broadcast designs, no CSI feedback may be supported for the multicast/broadcast transmission. For example, the network (e.g., BS 110, network controller 130, etc.) may select the multicast/broadcast transmission rate conservatively for all UEs in the target cell or target area (e.g., to ensure edge coverage of UEs in the target cell or target area). However, when there is a change with regard to the MBSFN/SC-PTM area or cell deployment, the rate may need be reevaluated and reselected, thus using resources of the network. In addition, not all UEs in the MBSFN/SC-PTM area or cell may actively receive a particular multicast/broadcast transmission, thereby rendering the rate determination inaccurate in some cases. Furthermore, transmitting multicast/broadcast information that is configured to ensure edge coverage may result in air interface inefficiency with regard to UEs that are near a cell center (e.g., since the rate may be needlessly conservative for such UEs).

In one approach for CSI feedback in a multicast/broadcast deployment (e.g., SC-PTM), a UE may enter a connected mode to provide CSI feedback to a BS. For example, the BS may provide information, such as information identifying a measurement threshold, to cause the UE to go to the connected mode. If the measurement satisfies the measurement threshold, the UE may enter a connected mode to transmit the CSI. However, entering the connected mode uses significant resources of the UE and the BS and increases latency associated with providing CSI feedback.

Some techniques and apparatuses described herein may provide CSI feedback for multicast/broadcast communication without requiring a UE to be in a connected mode. For example, some techniques and apparatuses described herein may use a random access mechanism to provide the CSI feedback. Furthermore, some techniques and apparatuses described herein may provide CSI feedback for system information. In some aspects, multiple different UEs may provide CSI feedback for a multicast/broadcast communication, thereby enabling more accurate channel estimation at the base station. In this way, processor and air interface resources that would otherwise be used to enter a connected state to provide CSI feedback may be conserved. Furthermore, efficiency of rate allocation for multicast/broadcast communications may be improved in comparison to performing rate allocation for all UEs in a coverage area (e.g., blindly, conservatively, etc.).

Figure 5:
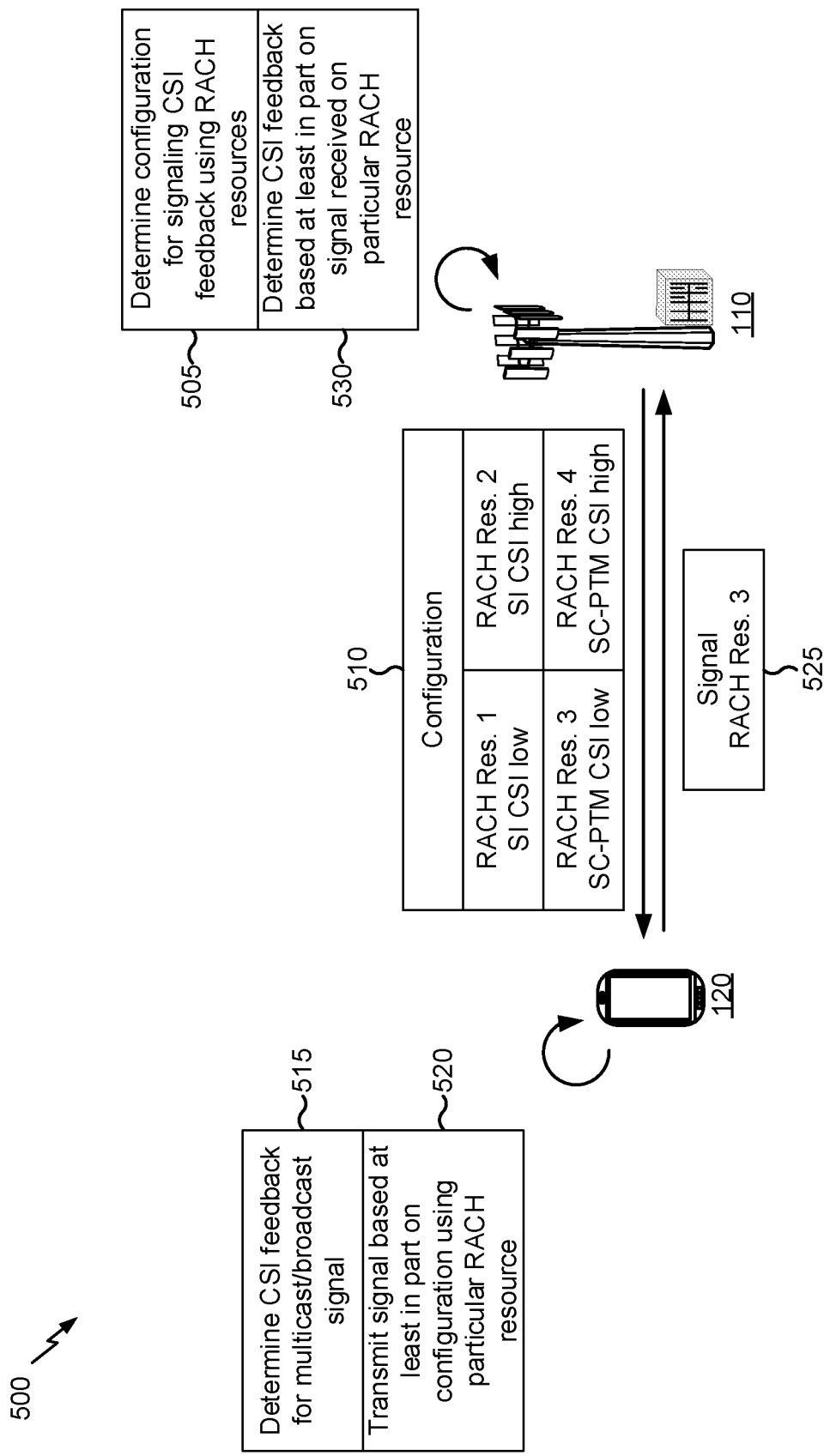
FIG. 5 is a diagram illustrating an example of providing CSI feedback based at least in part on a random access channel resource for multicast/broadcast communications, in accordance with various aspects of the present disclosure.

FIG. 5 is a diagram illustrating an example 500 of providing CSI feedback based at least in part on a random access channel resource for multicast/broadcast communications, in accordance with various aspects of the present disclosure.

As shown in FIG. 5, and by reference number 505, a BS 110 may determine a configuration for signaling CSI feedback using random access channel (RACH) resources. The configuration may identify a set of RACH resources to be used to indicate CSI feedback for a multicast/broadcast communication. As used herein, a RACH resource may refer to one or more random access channel resources, such as a physical random access (PRACH) channel resource and/or the like. UEs 120 that receive the multicast/broadcast communication may provide a signal on a particular RACH resource, of the set of RACH resources, that corresponds to the CSI feedback to be provided. In some aspects, the configuration may identify a mapping of RACH resources to CSI feedback states. In some aspects, the configuration may identify a set of RACH resources on which to provide CSI feedback. By configuring the UEs 120 to provide CSI feedback using the set of RACH resources, the UEs 120 need not enter a connected mode, thereby conserving processor and air interface resources of the UEs 120 and the BS 110.

As shown by reference number 510, the BS 110 may provide information identifying the configuration to a UE 120. Here, the configuration identifies four RACH resources: RACH Resource 1, RACH Resource 2, RACH Resource 3, and RACH Resource 4. In some aspects, a RACH resource may be identified based at least in part on a time, a frequency, a preamble, a coding scheme, and/or the like. In some aspects, different RACH resources may be associated with different multicast/broadcast communication types. For example, here, RACH Resource 1 and RACH Resource 2 are associated with a system information (SI) CSI, and RACH Resource 3 and RACH Resource 4 are associated with a SC-PTM CSI. In some aspects, the UE 120 may further determine CSI feedback for different services based at least in part on different DL signals. For example, the UE 120 may determine the CSI feedback for SI based at least in part on synchronization signal blocks (SSBs) or CSI reference signals (CSI-RS), while the UE 120 may determine the CSI for SC-PTM based at least in part on reference signals (RS) for SC-PTM transmission, and the UE 120 may further determine the CSI for MBMS based on RS for MBMS transmission. Other combinations are contemplated and the above is provided merely as an example.

As further shown, different RACH resources may be used to indicate different CSI feedback. For example, RACH Resource 1 is used to indicate a low SI CSI feedback (e.g., a CSI value that does not satisfy a threshold) and RACH Resource 2 is used to indicate a high SI CSI feedback (e.g., a CSI feedback value that satisfies the threshold). Similarly, RACH Resource 3 is used to indicate a low SC-PTM CSI feedback (e.g., a CSI value that does not satisfy a threshold) and RACH Resource 4 is used to indicate a high SC-PTM CSI feedback (e.g., a CSI feedback value that satisfies the threshold). The techniques and apparatuses described herein are not limited to those involving two levels of CSI feedback, and any configuration of one or more RACH resources for one or more levels of CSI feedback is contemplated herein.

As shown by reference number 515, the UE 120 may determine CSI feedback for a multicast/broadcast communication. For example, the UE 120 may determine a CQI, a PMI, a PTI, an RI, and/or the like for a multicast/broadcast communication of the UE 120. Here, the UE 120 may determine that the multicast/broadcast communication is a SC-PTM signal and is associated with a low CSI value. In some aspects, the UE 120 may determine CSI feedback for multiple, different multicast/broadcast communications. For example, the UE 120 may determine a first CSI feedback value for SI, a second CSI feedback value for SC-PTM, a third CSI feedback value for MBMS, and/or the like.

As shown by reference number 520, the UE 120 may transmit a signal based at least in part on the configuration using a particular RACH resource. As shown by reference number 525, the UE 120 may provide the signal using RACH resource 3. In some aspects, the signal may include any waveform. For example, the signal may include a preamble of a four-step RACH process, a payload of a four-step RACH process, a combined preamble and payload of a two-step RACH process, and/or the like. By transmitting the signal using RACH Resource 3, the UE 120 may indicate, to BS 110 and without entering a connected mode, that the SC-PTM signal is associated with a low CSI value. In the case wherein the UE 120 determines multiple, different CSI feedback values (e.g., for the same multicast/broadcast communication or for different multicast/broadcast communications), the UE 120 may transmit signals on multiple, different RACH resources according to the configuration. In this way, the UE 120 signals CSI feedback for multiple, different multicast/broadcast communications using RACH resources, thereby conserving resources that would be used to enter a connected mode to provide the CSI feedback.

As shown by reference number 530, the BS 110 may determine CSI feedback based at least in part on the signal received on the particular RACH resource. For example, the BS 110 may determine the CQI, PMI, PTI, RI, and/or the like for the UE 120. In some aspects, the BS 110 may determine a rate (e.g., a coding rate, a modulation scheme, a modulation and coding scheme, etc.) for a multicast/broadcast communication based at least in part on the CSI feedback. In some aspects, the BS 110 may transmit the multicast/broadcast communication using the rate. In this way, the BS 110 selects a rate based at least in part on CSI feedback from UEs 120 to receive the multicast/broadcast communication, thereby improving efficiency of rate selection and reducing resource usage associated with establishing a connected mode. In some aspects, the BS 110 may determine CSI feedback for multiple, different UEs 120, as described in more detail in connection with FIG. 6, below.

As indicated above, FIG. 5 is provided as an example. Other examples may differ from what is described with respect to FIG. 5.

Figure 6:
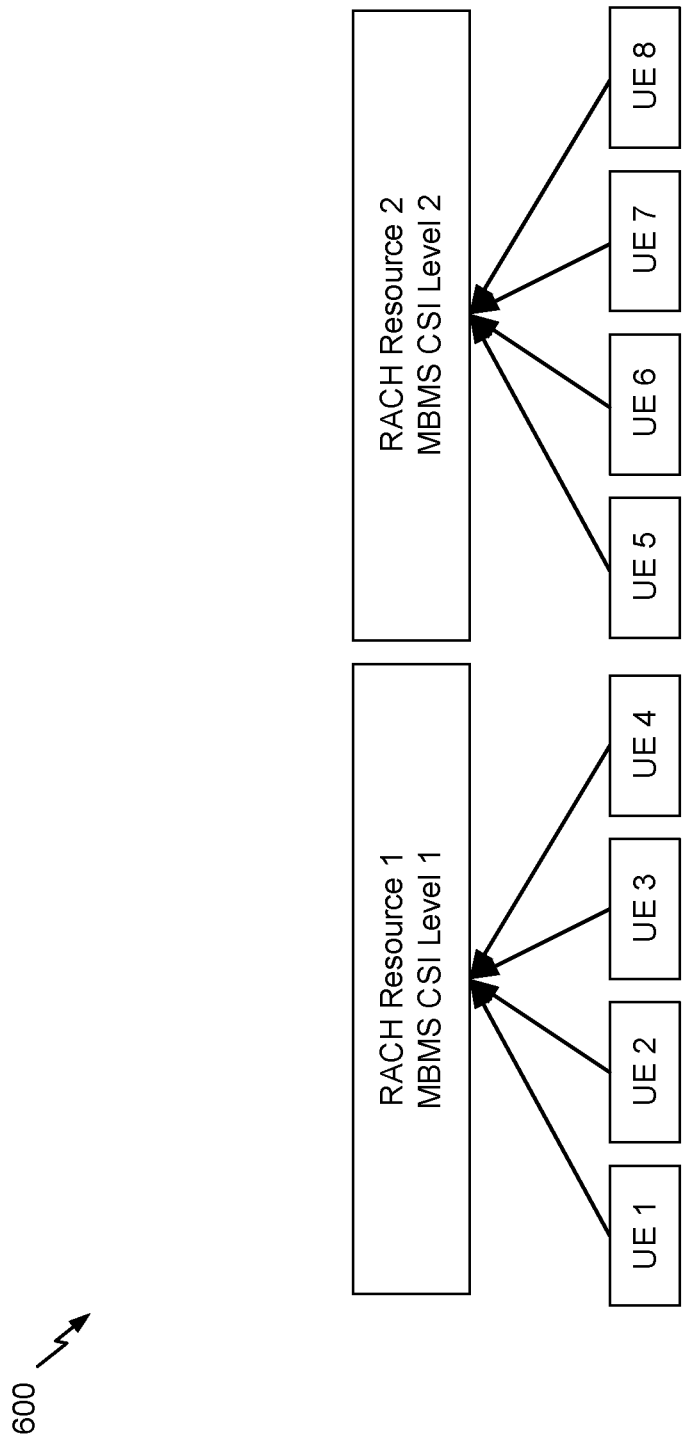
FIG. 6 is a diagram illustrating an example of providing CSI feedback for multiple UEs based at least in part on a random access channel resource for multicast/broadcast communications, in accordance with various aspects of the present disclosure.

FIG. 6 is a diagram illustrating an example 600 of providing CSI feedback for multiple UEs based at least in part on a random access channel resource for multicast/broadcast communications, in accordance with various aspects of the present disclosure. As shown, FIG. 6 is an example wherein UEs 1 through 8 (e.g., UEs 120) provide CSI feedback for an MBMS multicast/broadcast communication using RACH Resources 1 and 2. As further shown, RACH Resource 1 may be associated with a first CSI level (e.g., CSI level 1) and RACH Resource 2 may be associated with a second CSI level (e.g., CSI level 2).

As further shown, UEs 1 through 4 provide CSI feedback using RACH Resource 1 and UEs 5 through 8 provide CSI feedback using RACH Resource 2. In other words, multiple, different UEs may provide feedback using a single RACH resource. In some aspects, a BS (e.g., BS 110) may determine CSI feedback for the multiple, different UEs based at least in part on signals received on the single RACH resource. For example, the BS may determine an aggregate CSI feedback value based at least in part on a signal strength on the single RACH resource, a number of UEs transmitting on the single RACH resource, and/or the like. In some aspects, the BS may determine a rate based at least in part on the CSI feedback for the multiple, different UEs. For example, the BS may determine a rate to achieve a highest throughput with regard to the UEs 1 through 8 while maintaining a particular level of service for the UEs 1 thorough 8. In some aspects, the BS may transmit a multicast/broadcast communication using the rate. In this way, the BS may improve efficiency of allocating rates or other resources for multicast/broadcast communications with UEs based at least in part on non-connected-mode CSI feedback from the UEs.

As indicated above, FIG. 6 is provided as an example. Other examples may differ from what is described with respect to FIG. 6.

FIG. 7 is a diagram illustrating an example process 700 performed, for example, by a UE, in accordance with various aspects of the present disclosure. Example process 700 is an example where a UE (e.g., UE 120) performs CSI feedback based at least in part on a random access channel resource for multicast/broadcast communications.

As shown in FIG. 7, in some aspects, process 700 may include receiving configuration information identifying at least one random access channel resource to be used for channel state information (CSI) feedback regarding a multicast or broadcast (multicast/broadcast) signal (block 710). For example, the UE (e.g., using antenna 252, DEMOD 254, MIMO detector 256, receive processor 258, controller/processor 280, and/or the like) may receive configuration information from a BS (e.g., BS 110). The configuration information may identify RACH resources to be used for CSI feedback. The CSI feedback may be provided by the UE and/or other UEs regarding a multicast/broadcast communication, such as a multicast/broadcast signal.

As shown in FIG. 7, in some aspects, process 700 may include transmitting a signal based at least in part on the CSI feedback using the at least one random access channel resource (block 720). For example, the UE (e.g., using controller/processor 280, transmit processor 264, TX MIMO processor 266, MOD 254, antenna 252, and/or the like) may transmit a signal using at least one RACH resource. In some aspects, the UE may transmit the signal based at least in part on determining the CSI feedback. For example, the UE may transmit the signal using the at least one RACH resource based at least in part on the CSI feedback being associated with the at least one RACH resource according to the configuration information.

Process 700 may include additional aspects, such as any single aspect or any combination of aspects described below and/or in connection with one or more other processes described elsewhere herein.

In some aspects, the at least one random access channel resource includes a physical random access channel resource. In some aspects, the configuration information identifies at least one of a time, a frequency, or a preamble associated with the at least one random access channel resource. In some aspects, the at least one random access channel resource is one of a plurality of random access channel resources identified by the configuration information. The UE may select the at least one random access channel resource from the plurality of random access channel resources based at least in part on the CSI feedback.

In some aspects, the plurality of random access channel resources are associated with respective CSI feedback states, and the at least one random access channel resource is selected based at least in part on a CSI feedback state associated with the at least one random access channel resource. In some aspects, the at least one random access channel resource is a first random access channel resource to be used for CSI feedback regarding a first type of transmission, and the configuration information identifies a second random access channel resource to be used for CSI feedback regarding a second type of transmission.

In some aspects, the configuration information is received in system information or control information. In some aspects, the UE may determine the CSI feedback based at least in part on a reference signal associated with the multicast/broadcast signal. In some aspects, the signal is transmitted without the UE entering a connected mode. In some aspects, the signal is transmitted while the UE is in an idle mode. In some aspects, the signal is transmitted without the UE transitioning from an idle mode to a connected mode. In some aspects, the signal comprises a random access preamble. In some aspects, the signal comprises a random access payload. In some aspects, the signal comprises a random access preamble and payload in a single message.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

FIG. 8 is a diagram illustrating an example process 800 performed, for example, by a base station, in accordance with various aspects of the present disclosure. Example process 800 is an example where a base station (e.g., BS 110) performs determination of CSI feedback based at least in part on a random access channel resource for multicast/broadcast communications.

As shown in FIG. 8, in some aspects, process 800 may include transmitting configuration information identifying at least one random access channel resource to be used for channel state information (CSI) feedback regarding a multicast or broadcast (multicast/broadcast) signal to be provided to a plurality of user equipment (UEs) (block 810). For example, the base station (e.g., using controller/processor 240, transmit processor 220, TX MIMO processor 230, MOD 232, antenna 234, and/or the like) may transmit configuration information. In some aspects, the base station may determine the configuration information. The configuration information may identify at least one RACH resource to be used for CSI feedback regarding a multicast/broadcast signal. The multicast-broadcast signal may be provided to a plurality of UEs (e.g., UE 120). For example, the UEs may provide the CSI feedback using the at least one RACH resource.

As shown in FIG. 8, in some aspects, process 800 may include determining the CSI feedback based at least in part on a signal received on the at least one random access channel resource (block 820). For example, the base station (e.g., using controller/processor 240 and/or the like) may determine the CSI feedback based at least in part on a signal received on the at least one RACH resource. In some aspects, the base station may determine the CSI feedback based at least in part on the configuration information. In some aspects, the base station may determine the CSI feedback for multiple UEs, such as the plurality of UEs or a subset of the plurality of UEs.

Process 800 may include additional aspects, such as any single aspect or any combination of aspects described below and/or in connection with one or more other processes described elsewhere herein.

In some aspects, the at least one random access channel resource includes a physical random access channel resource. In some aspects, the configuration information identifies at least one of a time, a frequency, or a preamble associated with the at least one random access channel resource. In some aspects, the at least one random access channel resource is one of a plurality of random access channel resources identified by the configuration information, and the CSI feedback is determined based at least in part on which random access channel resource, of the plurality of random access channel resources, includes the signal. In some aspects, the plurality of random access channel resources are associated with respective CSI feedback states.

In some aspects, the at least one random access channel resource is a first random access channel resource to be used for CSI feedback regarding a first type of transmission, and the configuration information identifies a second random access channel resource to be used for CSI feedback regarding a second type of transmission. In some aspects, the CSI feedback represents CSI feedback for a group of UEs of the plurality of UEs. In some aspects, the configuration information is transmitted in system information or control information. In some aspects, the CSI feedback is determined based at least in part on a strength or power of the signal. In some aspects, the base station may determine a modulation or coding configuration based at least in part on the CSI feedback. In some aspects, the signal is generated by multiple, different UEs of the plurality of UEs. In some aspects, the signal is generated by multiple UEs, of the plurality of UEs, that are in the idle mode. In some aspects, the signal comprises a random access preamble and payload in a single message.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the term "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
receiving, from a base station, configuration information identifying a plurality of random access channel resources usable by a plurality of UEs including the UE for providing channel state information (CSI) feedback regarding a multicast or broadcast (multicast/broadcast) signal;
receiving, from the base station, the multicast/broadcast signal;
generating CSI feedback based on the reception of the multicast/broadcast signal;
determining at least one of a state or a type of the CSI feedback;
selecting, from the plurality of random access channel resources, at least one random access channel resource based on the state or the type of the CSI feedback; and
transmitting, to the base station while in a radio resource control (RRC) idle mode without transitioning to an RRC connected mode, a signal indicating the CSI feedback based at least in part on the state or the type of the CSI feedback using the at least one random access channel resource, the use of the at least one random access channel resource indicating the state or the type of the CSI feedback to the base station.

2. The method of claim 1, wherein the at least one random access channel resource includes a physical random access channel resource.

3. The method of claim 1, wherein the configuration information identifies at least one of a time, a frequency, or a preamble associated with the at least one random access channel resource.

4. The method of claim 1, wherein the configuration information is received in system information or control information.

5. The method of claim 1, further comprising:
determining the CSI feedback based at least in part on a reference signal associated with the multicast/broadcast signal.

6. The method of claim 1, wherein the signal comprises a random access preamble.

7. The method of claim 1, wherein the signal comprises a random access payload.

8. The method of claim 1, wherein the signal comprises a random access preamble and payload in a single message.

9. The method of claim 1, wherein the selection of the at least one random access channel resource based on the state or the type of the CSI feedback comprises:
determining a mapping of a plurality of states or types of CSI feedback to respective random access channel resources of the plurality of random access channel resources based on the configuration, wherein the selection of the at least one random access channel resource comprises identifying the at least one random access channel resource based on the state or the type of the CSI feedback and the mapping.

10. The method of claim 1, wherein the multicast/broadcast signal includes system information or a reference signal, wherein the type of the CSI feedback is determined based on whether the CSI feedback is based on the system information or the reference signal.

11. The method of claim 10, wherein the system information includes a synchronization signal block or a CSI reference signal, wherein the type of the CSI feedback is determined based on whether the CSI feedback is based on the synchronization signal block or the CSI reference signal.

12. The method of claim 10, wherein the reference signal is a reference signal for single-cell point-to-multipoint transmission or a reference signal for multimedia broadcast/multicast service transmission, wherein the type of the CSI feedback is determined based on whether the CSI feedback is based on the reference signal for single-cell point-to-multipoint transmission or the reference signal for multimedia broadcast/multicast service transmission.

13. The method of claim 1, wherein the state of the CSI feedback indicates whether at least one CSI value satisfies a threshold or does not satisfy the threshold.

14. The method of claim 1, wherein the selection of the at least one random access channel resource is based on both the state and the type of the CSI feedback.

15. A method of wireless communication performed by a base station (BS), comprising:
    transmitting configuration information identifying a plurality of random access channel resources usable by a plurality of UEs including the UE for providing channel state information (CSI) feedback regarding a multicast or broadcast (multicast/broadcast) signal to be transmitted to a plurality of user equipment (UEs);
    transmitting the multicast/broadcast signal to the plurality of UEs;
    receiving, from at least one UE of the plurality of UEs while the at least one UE is in a radio resource control (RRC) idle mode, a signal indicating CSI feedback associated with the multicast/broadcast signal, the signal being received on at least one random access channel resource of the plurality of random access channel resources, the reception of the signal on the at least one random access channel resource indicating a state or a type of the CSI feedback; and
    interpreting the CSI feedback based at least in part on the state or the type of CSI feedback indicated by the at least one random access channel resource.

16. The method of claim 15, wherein the at least one random access channel resource includes a physical random access channel resource.

17. The method of claim 15, wherein the configuration information identifies at least one of a time, a frequency, or a preamble associated with the at least one random access channel resource.

18. The method of claim 15, wherein the CSI feedback represents CSI feedback for a group of UEs of the plurality of UEs.

19. The method of claim 15, wherein the CSI feedback is determined based at least in part on a strength or power of the signal.

20. The method of claim 15, further comprising:
    determining a modulation or coding configuration based at least in part on the CSI feedback.

21. The method of claim 15, wherein the signal is generated by multiple, different UEs of the plurality of UEs.

22. The method of claim 15, wherein the signal is generated by multiple UEs, of the plurality of UEs, that are in an idle mode.

23. The method of claim 15, wherein the signal comprises at least one of:
    a random access preamble,
    a random access payload, or
    a random access preamble and payload in a single message.

24. The method of claim 15, wherein the interpretation of the CSI feedback based on the state or the type of the CSI feedback comprises:
    determining a mapping of a plurality of states or types of CSI feedback to respective random access channel resources of the plurality of random access channel resources based on the configuration, wherein the interpretation of the CSI feedback comprises identifying the state or the type of the CSI feedback based on a location of the at least one random access channel resource and the mapping.

25. The method of claim 15, wherein the multicast/broadcast signal includes system information or a reference signal, wherein the type of the CSI feedback indicates whether the CSI feedback is based on the system information or the reference signal.

26. The method of claim 25, wherein the system information includes a synchronization signal block or a CSI reference signal, wherein the type of the CSI feedback indicates whether the CSI feedback is based on the synchronization signal block or the CSI reference signal.

27. The method of claim 25, wherein the reference signal is a reference signal for single-cell point-to-multipoint transmission or a reference signal for multimedia broadcast/multicast service transmission, wherein the type of the CSI feedback indicates whether the CSI feedback is based on the reference signal for single-cell point-to-multipoint transmission or the reference signal for multimedia broadcast/multicast service transmission.

28. The method of claim 15, wherein the state of the CSI feedback indicates whether at least one CSI value satisfies a threshold or does not satisfy the threshold.

29. The method of claim 15, wherein the at least one random access channel resource indicates both the state and the type of the CSI feedback.

30. A user equipment (UE) for wireless communication, comprising:
    a memory; and
    one or more processors coupled to the memory, the memory and the one or more processors configured to:
        receive, from a base station, configuration information identifying a plurality of random access channel resources usable by a plurality of UEs including the UE for providing channel state information (CSI) feedback regarding a multicast or broadcast (multicast/broadcast) signal;
        receive, from the base station, the multicast/broadcast signal;
        generate CSI feedback based on the reception of the multicast/broadcast signal;
        determine at least one of a state or a type of the CSI feedback;
        select, from the plurality of random access channel resources, at least one random access channel resource based on the state or the type of the CSI feedback; and
        transmit, to the base station while in a radio resource control (RRC) idle mode without transitioning to an RRC connected mode, a signal indicating the CSI feedback based at least in part on the state or the type of the CSI feedback using the at least one random access channel resource, the use of the at least one random access channel resource indicating the state or the type of the CSI feedback to the base station.

31. A base station for wireless communication, comprising:
    a memory; and
    one or more processors coupled to the memory, the memory and the one or more processors configured to:
        transmitting configuration information identifying a plurality of random access channel resources usable by a plurality of UEs including the UE for providing channel state information (CSI) feedback regarding a multicast or broadcast (multicast/broadcast) signal to be transmitted to a plurality of user equipment (UEs);
        transmitting the multicast/broadcast signal to the plurality of UEs;
        receiving, from at least one UE of the plurality of UEs while the at least one UE is in a radio resource control (RRC) idle mode, a signal indicating CSI feedback associated with the multicast/broadcast signal, the signal being received on at least one random access channel resource of the plurality of random access channel resources, the reception of the signal on the at least one random access channel resource indicating a state or a type of the CSI feedback; and interpreting the CSI feedback based at least in part on the state or the type of CSI feedback indicated by the at least one random access channel resource.

32. The base station of claim 31, wherein the signal is generated by multiple, different UEs of the plurality of UEs.

* * * * *